US011230957B2

(12) United States Patent
Gong

(10) Patent No.: US 11,230,957 B2
(45) Date of Patent: Jan. 25, 2022

(54) ADAPTIVE UREA MIXER

(71) Applicant: NANJING LONSEN AUTOMATION EQUIPMENT CO., LTD., Nanjing (CN)

(72) Inventor: ChangYou Gong, Nanjing (CN)

(*) Notice: Subject to any disclaimer, the term of this patent is extended or adjusted under 35 U.S.C. 154(b) by 0 days.

(21) Appl. No.: 16/968,176

(22) PCT Filed: Dec. 12, 2018

(86) PCT No.: PCT/CN2018/120580
§ 371 (c)(1),
(2) Date: Mar. 1, 2021

(87) PCT Pub. No.: WO2020/103225
PCT Pub. Date: May 28, 2020

(65) Prior Publication Data
US 2021/0180496 A1 Jun. 17, 2021

(30) Foreign Application Priority Data
Nov. 19, 2018 (CN) .......................... 201811376017.1

(51) Int. Cl.
*F01N 3/20* (2006.01)
*F01N 3/28* (2006.01)
(52) U.S. Cl.
CPC .............. *F01N 3/208* (2013.01); *F01N 3/28* (2013.01); *F01N 2240/20* (2013.01); *F01N 2330/38* (2013.01); *F01N 2610/02* (2013.01)
(58) Field of Classification Search
CPC ........ F01N 3/208; F01N 3/28; F01N 2240/20; F01N 2290/00; F01N 9/00; F01N 3/2892;
(Continued)

(56) References Cited

U.S. PATENT DOCUMENTS 6,449,947 B1 9/2002 Liu et al.
8,646,258 B2* 2/2014 Vanvolsem ........... B01F 5/0451
60/295

FOREIGN PATENT DOCUMENTS

CN 102477890 A 5/2012
CN 204984551 U 1/2016
(Continued)

OTHER PUBLICATIONS

ISR of PCT/CN2018/120580.

*Primary Examiner* — Brandon D Lee

(57) ABSTRACT

An adaptive urea mixer comprises a housing (1) and a first movable plate (2), a second movable plate (3), and a first fixed ring (4) sequentially provided in a direction from an air inlet to an air outlet in the housing. The first fixed ring (4) is fixedly connected to an inner side wall of the housing (1). A plurality of guide columns (9) are provided on the first fixed ring (4). A first position-limiting portion and a second position-limiting portion are provided on the guide column (9). The first movable plate and the second movable plate are sleeved on the guide column (9). A first elastic support element (12) is sleeved on the guide column (9) between the second position-limiting portion (11) and the first movable plate (2), and a second elastic support element (13) is sleeved on the guide column (9) between the first fixed ring (4) and the second movable plate (3). Both a first flow guide plate and a second flow guide plate are fixedly connected to the first fixed ring (4). The first movable plate (2), the second movable plate (3), the first flow guide plate (5), and the second flow guide plate (6) define a mixing space (14). A urea nozzle (7) is provided on a side wall of the housing corresponding to the mixing space (14). The adaptive urea mixer adapts to a change in a flow rate of exhaust gas so as to automatically remove internal crystals, thereby preventing the crystals from blocking the urea mixer.

10 Claims, 6 Drawing Sheets

(58) Field of Classification Search
CPC ... F01N 3/2066; F01N 3/2882; F01N 2260/06
See application file for complete search history.

(56) References Cited

FOREIGN PATENT DOCUMENTS

| | | |
|---|---|---|
| CN | 105298599 A | 2/2016 |
| CN | 206016913 U | 3/2017 |
| CN | 206592185 U | 10/2017 |

* cited by examiner

ADAPTIVE UREA MIXER

TECHNICAL FIELD

The present invention relates to the technical field of an engine exhaust system, in particular to an adaptive urea mixer.

BACKGROUND

The SCR system refers to the selective catalytic reduction system, which is a treatment process for the $NO_x$ in the exhaust emissions of diesel vehicles. That is to say, under the action of a catalyst, the reducing agent ammonia or urea is injected to reduce the $NO_x$ in the exhaust gas to $N_2$ and $H_2O$. There are two types of catalysts: precious metals and non-precious metals. The SCR system was initially applied to the denitration of flue gas in power plants. As the motor vehicle emission regulations become more and more stringent, the SCR system is gradually used for control of motor vehicle exhaust emission. At present, the urea SCR technology in which $NH_3$ produced by urea decomposition is used as a reducing agent is mostly used in the motor vehicle exhaust. In the urea SCR system, the urea aqueous solution is sprayed into the exhaust pipe through a urea nozzle, and needs to undergo physical and chemical processes such as evaporation, pyrolysis, and hydrolysis to form reducing agents ($NH_3$, HNCO) so as to undergo oxidation-reduction reaction with the pollutant $NO_x$ emitted by the engine, ultimately achieving the goal of reducing $NO_x$ emissions. The urea mixer is generally used in the urea SCR system to organize the movement of the airflow, and the urea mixer is generally provided between the urea nozzle and the catalyst carrier.

The urea mixer can promote the mixing of urea and exhaust gas, optimize the distribution of urea, and reduce ammonia leakage. However, in the operation condition that the exhaust temperature is low, the urea aqueous solution may not be completely decomposed due to contact, with the low temperature wall surface and poor atomization quality. Complexes with complicated components such as cyanurodiamide and melamine are formed in the reaction process, these complexes will form crystals when accumulating to a certain extent, and the exhaust in the existing urea mixer flows very slow, which intensifies the formation of crystals. Most of these crystals appear on the surface of the urea mixer, which are white blocks and hard in texture, and can increase with the continuous injection of the urea aqueous solution. The increase of crystals to a certain extent will block the urea mixer and greatly increase the exhaust back pressure so that the performance of the whole machine deteriorates.

SUMMARY

The object of the present invention is to provide an adaptive urea mixer to solve the above problems in the prior art, which can adapt to a change in a flow rate of exhaust gas under different engine operating conditions so as to automatically remove internal crystals, thereby preventing the crystals from blocking the urea mixer, avoiding excessive engine exhaust back pressure and ensuring the performance of the engine.

In order to achieve the above object, the present invention provides the following solutions.

The present invention provides an adaptive urea mixer, comprising a housing, a first movable plate, a second movable plate, a first fixed ring, a first flow guide plate, a second flow guide plate, and a urea nozzle; wherein the housing is a hollow cylinder, the housing is formed with an air inlet and an air outlet at two opposite ends, respectively, the second movable plate, the first movable plate, and the first fixed ring are sequentially provided in a direction from an air inlet to an air outlet in the housing; the first fixed ring is circumferentially fixedly connected to an inner side wall of the housing, a plurality of guide columns provided in parallel are circumferentially fixedly provided on the first fixed ring, each of the guide columns extends toward the air inlet, a first position-limiting portion and a second position-limiting portion are provided on each of the guide columns, and the second position-limiting portion is located between the first fixed ring, and the first position-limiting portion; the first movable plate is slidingly sleeved on the guide column between the first position-limiting portion and the second position-limiting portion, the second movable plate is slidingly sleeved on the guide column between the second position-limiting portion and the first fixed ring, a first elastic support element is sleeved on the guide column between the second position-limiting portion and the first movable plate, and a second elastic support element is sleeved on the guide column between the first fixed ring and the second movable plate; one end of a first flow guide plate and one end of a second flow guide plate are both fixedly connected to the first fixed ring, both the first flow guide plate and the second flow guide plate extend toward the air inlet and pass through the second movable plate and the first movable plate in turn, the first movable plate and the second movable plate are provided with a first notch and a second notch, respectively, the first notch and the second notch are located on both sides of the first flow guide plate, respectively, the first movable plate, the second movable plate, the first flow guide plate; and the second flow guide plate define a mixing space, and the urea nozzle is provided on a side wall of the housing corresponding to the mixing space.

Preferably, the adaptive urea mixer further comprises a second fixed ring which is circumferentially fixedly connected to the inner side wall of the housing, the second fixed ring is located between the first movable plate and the air inlet, and the first flow guide plate, the second flow guide plate and each of the guide columns all extend to a second fixed plate and are fixedly connected to the second fixed plate.

Preferably, the air inlet is used to connect with an exhaust pipe, and the rigidity of the first elastic support element is greater than the rigidity of the second elastic support element.

Preferably, the second flow guide plate comprises a first arc-shaped plate with an axis parallel to the axis of the housing.

Preferably, the first flow guide plate comprises a flow guide flat plate and a second arc-shaped plate formed from one side of the flow guide plate, and the axis of the second arc-shaped plate is parallel to the axis of the housing.

Preferably, the first elastic support element and the second elastic support element are both springs.

Preferably, the first movable plate and the second movable plate are provided with a first guide groove and a second guide groove for penetrating the first flow guide plate, respectively, both the first guide groove and the second guide groove are in clearance fit with the first flow guide plate; the first movable plate and the second movable plate are provided with a third guide groove and a fourth guide groove for penetrating the second flow guide plate, respectively, and both the third guide groove and the fourth guide groove are in clearance fit with the second flow guide plate.

Preferably, there are three guide columns, which are circumferentially evenly distributed on the first fixed ring.

Preferably, both the initial states of the first elastic support element and the second elastic support element are compressed states.

Preferably, a plurality of vent holes are distributed on both the first movable plate and the second movable plate.

Compared with the prior art, the present invention has achieved the following technical effects.

In the adaptive urea mixer provided by the present invention, the first movable plate, the second movable plate, the first flow guide plate, and the second flow guide plate define a mixing space. When in use, the air inlet is used to connect with the exhaust pipe. When the exhaust gas is discharged, the exhaust gas enters the mixing space from the first notch and is mixed with the urea aqueous solution sprayed by the urea nozzle, and then is discharged from the second notch and enters the subsequent catalytic converter for catalytic reaction. The urea aqueous solution forms swirling flow in the mixing space under the action of exhaust gas, the mixing effect is good, and the formation of crystals can be reduced to a certain extent. When the exhaust gas pressure is greater than the elastic support force of the second elastic support element on the second movable plate, the second movable plate moves toward the first fixed ring. When the exhaust gas pressure is greater than the elastic support force of the first elastic support element on the first movable plate, the first movable plate moves toward the second movable plate. During the movement of the first movable plate and the second movable plate, the crystals attached to the side walls of the first flow guide plate and the second flow guide plate are scraped off by the first movable plate and the second movable plate, and are discharged with the exhaust gas. The width of the first flow guide plate is designed according to the spray range of the urea nozzle, which can completely cover the crystalizable area within the spray range of the urea nozzle, eliminate the increase of crystals, and adapt to a change in a flow rate of exhaust gas under different engine operating conditions so as to automatically remove internal crystals, thereby preventing the crystals from blocking the urea mixer, avoiding excessive engine exhaust back pressure, ensuring the performance of the engine, and improving the service life of the engine and the adaptive urea mixer.

BRIEF DESCRIPTION OF THE DRAWINGS

In order to explain the embodiments of the present invention or the technical solutions in the prior art more clearly, the drawings required in the embodiments will be briefly introduced hereinafter. Obviously, the drawings in the following description are only some embodiments of the present invention. For those skilled in the art, other drawings may be obtained from these drawings without paying creative labor.

In the figures: 1—housing; 2—first movable plate; 3—second movable plate; 4—first fixed ring; 5—first flow guide plate; 61—second flow guide plate; 7—urea nozzle; 8—air inlet; 9—guide column; 10—first, position-limiting portion; 11—second position-limiting portion; 12—first elastic support element; 13—second elastic support element; 14—mixing space; 15—first notch; 16—second notch; 17—second fixed ring.

DESCRIPTION OF THE EMBODIMENTS

The technical solutions in the embodiments of the present invention will be clearly and completely described below in conjunction with the accompanying drawings in the embodiments of the present invention. Obviously, the described embodiments are only some embodiments of the present invention, rather than all the embodiments. Based on the embodiments of the present invention, all other embodiments obtained by those skilled in the art without paying creative labor shall fall within the protection scope of the present invention.

The object of the present invention is to provide an adaptive urea mixer to solve the above problems in the prior art, which can adapt to a change in a flow rate of exhaust gas under different engine operating conditions so as to automatically remove internal crystals, thereby preventing the crystals from blocking the urea mixer, avoiding excessive engine exhaust hack pressure and ensuring the performance of the engine.

In order to make the above object, features and advantages of the present invention more obvious and understandable, the present invention will be further described in detail below in conjunction with the accompanying drawings and specific embodiments.

Figure 1:
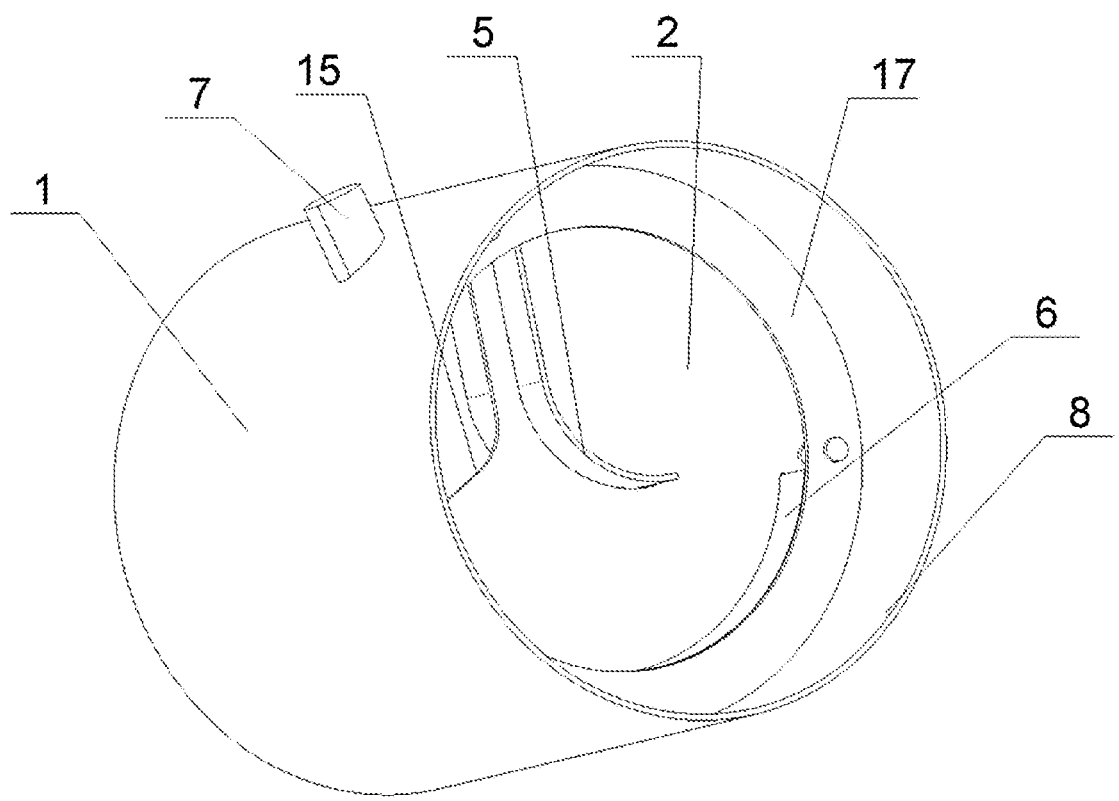
FIG. 1 is a schematic diagram of the overall structure of an adaptive urea mixer according to the present invention.
Figure 2:
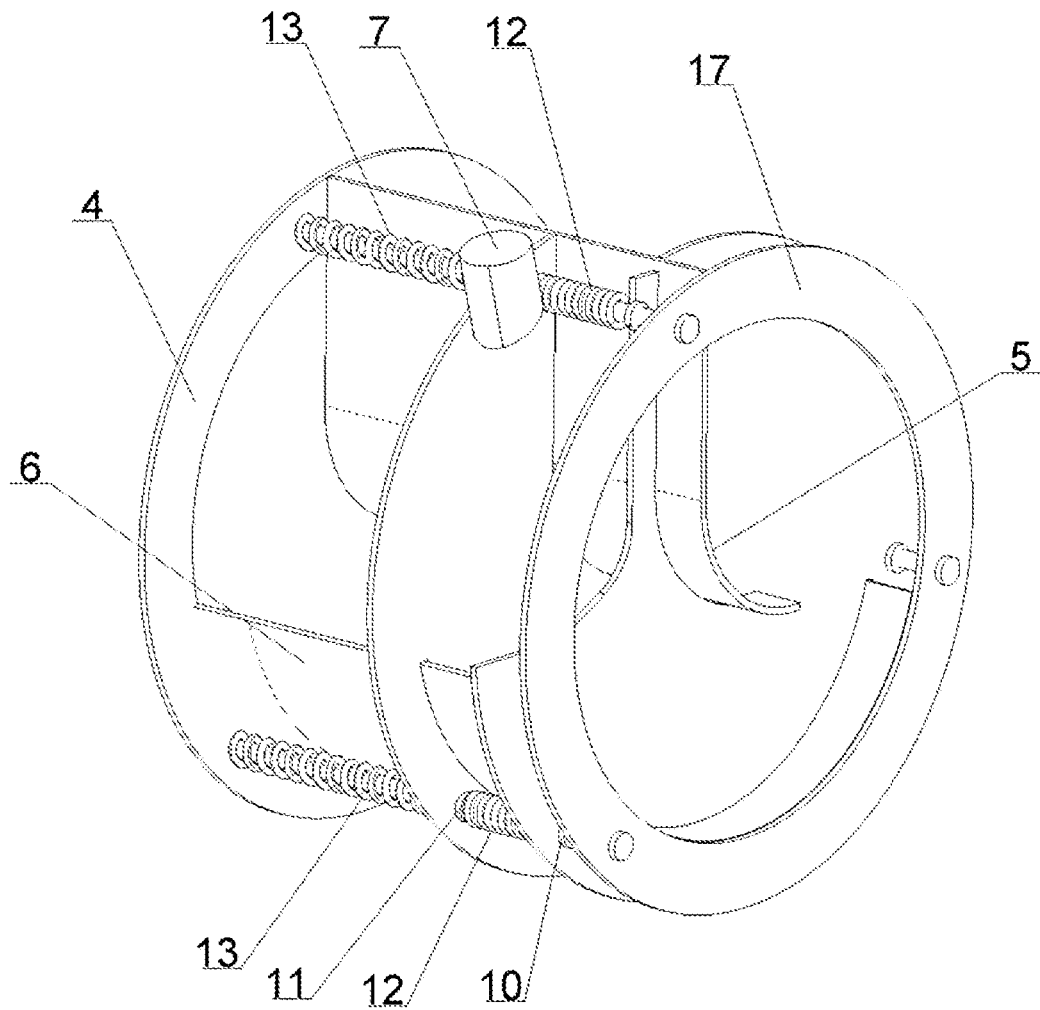
FIG. 2 is a schematic structural diagram of an adaptive urea mixer according to the present invention from one perspective after a housing is removed.
Figure 3:
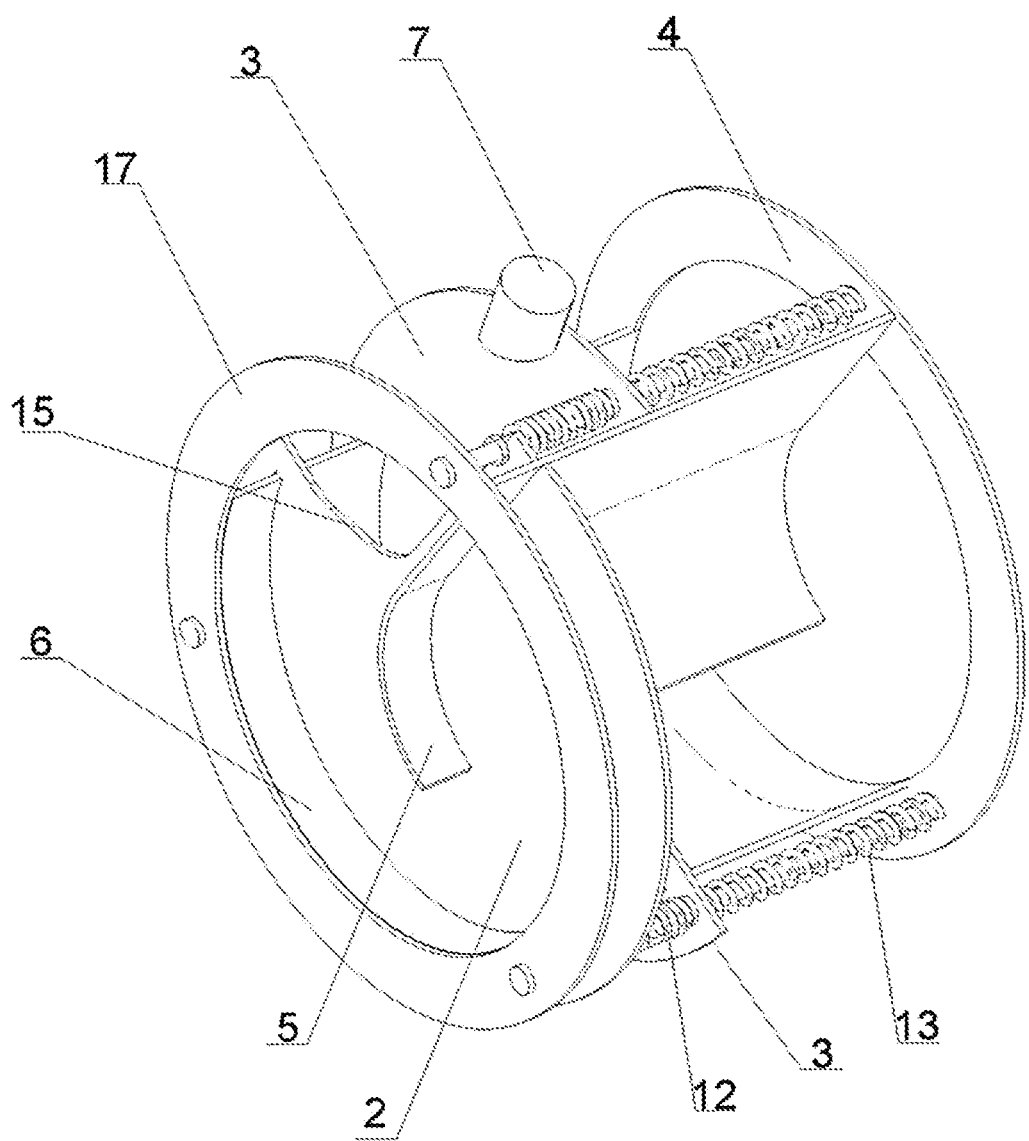
FIG. 3 is a schematic structural diagram of an adaptive urea mixer according to the present invention from another perspective after a housing is removed.
Figure 4:
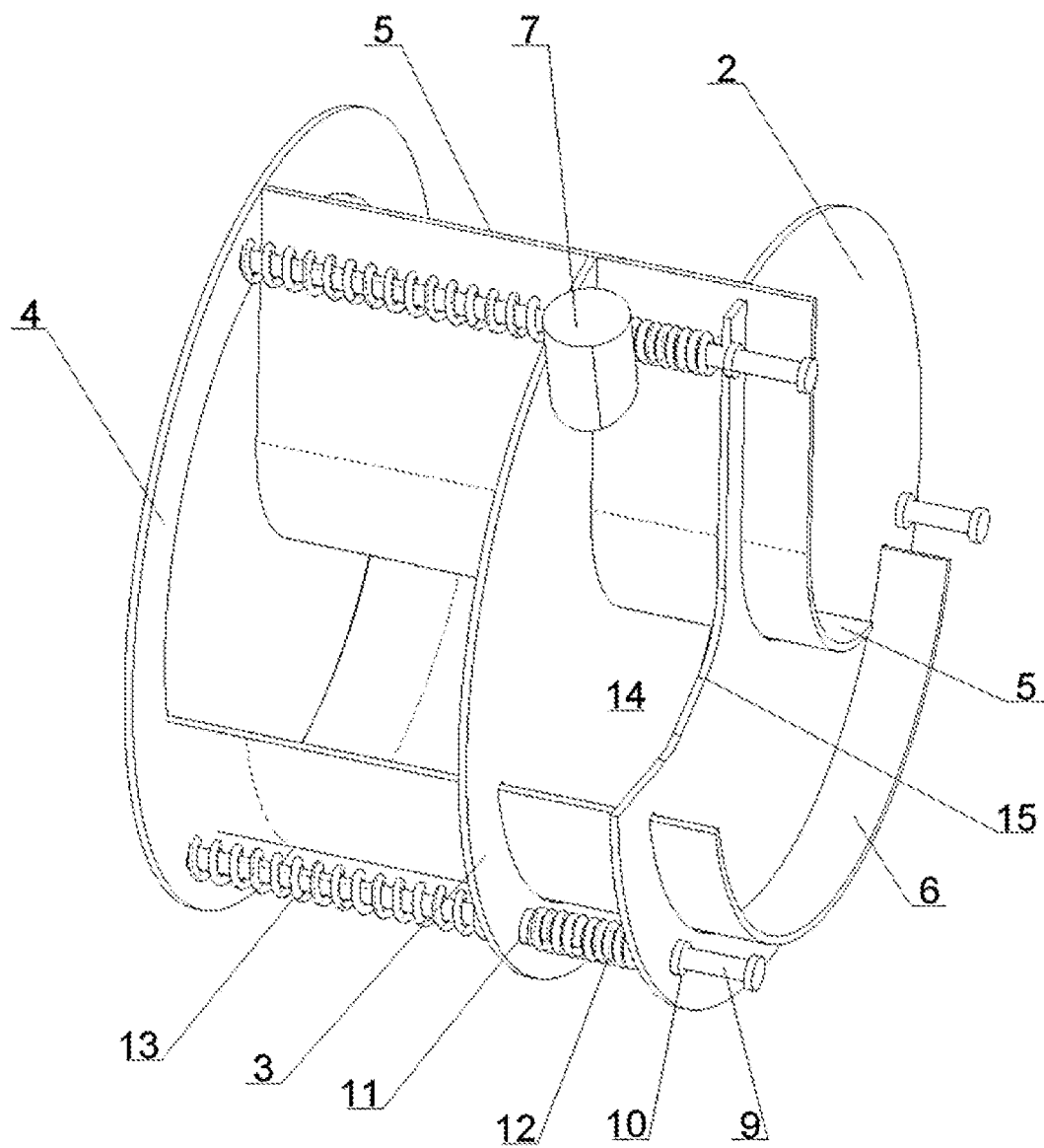
FIG. 4 is a schematic structural diagram of an adaptive urea mixer according to the present invention after a housing and a second fixed ring are removed.
Figure 5:
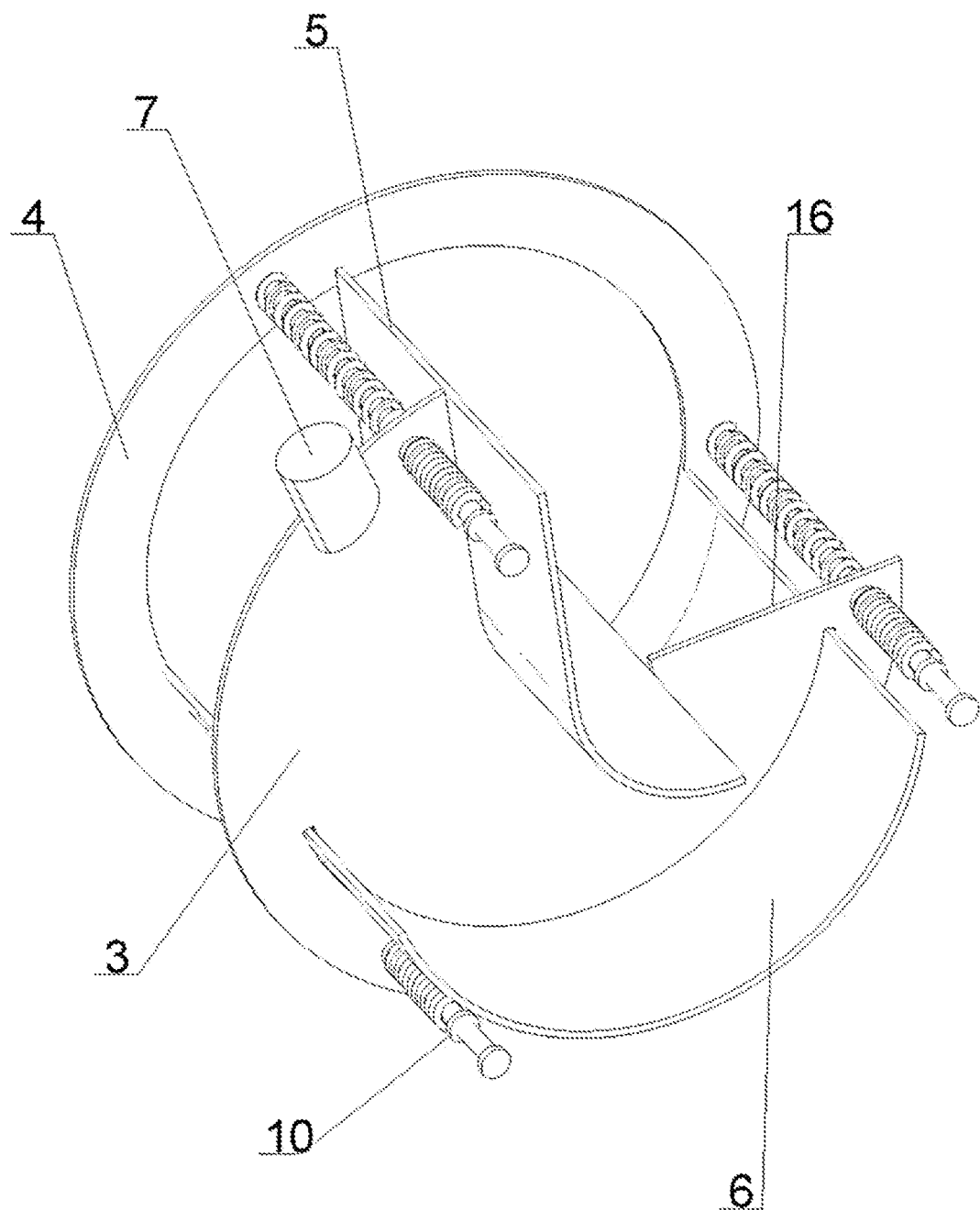
FIG. 5 is a schematic structural diagram of an adaptive urea mixer according to the present invention from one perspective after a housing, a second fixed ring and a first movable plate are removed.
Figure 6:
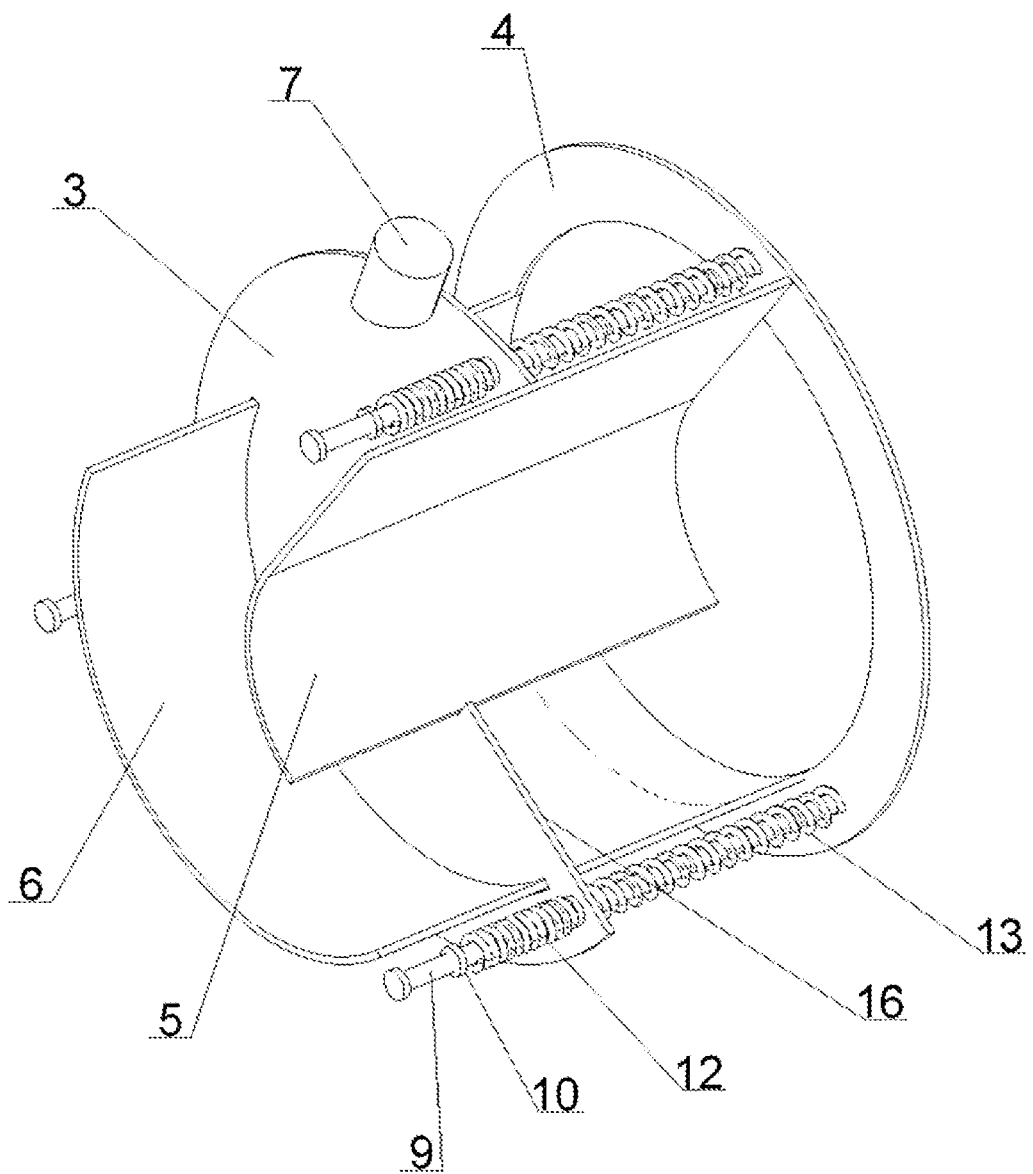
FIG. 6 is a schematic structural diagram of an adaptive urea mixer according to the present invention from one another after a housing, a second fixed ring and a first movable plate are removed.

As shown in FIGS. 1 to 6, the present invention provides an adaptive urea mixer. In a specific embodiment of the present invention, the adaptive urea mixer comprises a housing 1, a first movable plate 2, a second movable plate 3, a first fixed ring 4, a first flow guide plate 5, a second flow guide plate 6, and a urea nozzle 7; wherein the housing 1 is a hollow cylinder, the housing 1 is formed with an air inlet 8 and an air outlet at two opposite ends, respectively, the first movable plate 2, the second movable plate 3, and the first fixed ring 4 are sequentially provided, in a direction from an air inlet 8 to an air outlet in the housing 1; the first fixed ring 4 is circumferentially fixedly connected to an inner side wall of the housing 1, a plurality of guide columns 9 provided in parallel are circumferentially fixedly provided on the first fixed ring 4, each of the guide columns 9 extends toward the air inlet 8 a first position-limiting portion 10 and a second position-limiting portion 11 are provided on each of the guide columns 9, and the second position-limiting portion 11 is located between the first fixed ring 4 and the first position-limiting portion 10; the first movable plate 2 is slidingly sleeved on the guide column 9 between the first position-limiting portion 10 and the second position-limiting portion 11, the second movable plate 3 is slidingly sleeved on the guide column 9 between the second position-limiting portion 11 and the first fixed ring 4, a first elastic support element 12 is sleeved on the guide column 9 between the second position-limiting portion 11 and the first movable plate 2, and a second elastic support element 13 is sleeved on the guide column 9 between the first fixed ring 4 and the second movable plate 3, one end of a first flow guide plate 5 and one end of a second flow guide plate 6 are both fixedly connected to the first fixed ring 4, both the first flow guide plate 5 and the second flow guide plate 6 extend toward the air inlet 8 and pass through the second movable plate 3 and the first movable plate 2 in turn, the first movable plate 2 and the second movable plate 3 are provided with a first notch 15 and a second notch 16, respectively, the first notch 15 and the second notch 16 are located on both sides of the first flow guide plate 5, respectively, the first movable plate 2, the second movable plate 3, the first flow guide plate 5, and the second flow guide plate 6 define a mixing space 14, and the urea nozzle 7 is provided on a side wall of the housing 1 corresponding to the mixing space 14 to spray the urea aqueous solution into the mixing space 14.

In the adaptive urea mixer provided by the present invention, the cross-sectional shapes of the first movable plate 2 and the second movable plate 3 are adapted to the cross-sectional shape of the inner cavity of the housing 1, and a first notch 15 and a second notch 16 are provided on the first movable plate 2 and the second movable plate 3, respectively, the first notch 15 and the second notch 16 are located on both sides of the first flow guide plate 5, respectively, and the first notch 15 and the second notch 16 are preferably provided on the edges of the first movable plate 2 and the second movable plate 3, respectively. The first movable plate 2, the second movable plate 3, the first flow guide plate 5, and the second flow guide plate 6 define a mixing space 14. When in use, the air inlet 8 is used to connect with the exhaust pipe. When the exhaust gas is discharged, the exhaust gas enters the mixing space 14 from the first notch 15 and is mixed with the urea aqueous solution sprayed by the urea nozzle 7, and then is discharged from the second notch 16 and enters the subsequent catalytic converter for catalytic reaction. The urea aqueous solution forms swirling flow in the mixing space 14 under the action of exhaust gas, the mixing effect is good, and the formation of crystals can be reduced to a certain extent. When the exhaust gas pressure is greater than the elastic support force of the second elastic support element 13 on the second movable plate 3, the second movable plate 3 moves toward the first fixed ring 4. When the exhaust gas pressure is greater than the elastic support force of the first elastic support element 12 on the first movable plate 2, the first movable plate 2 moves toward the second movable plate 3. During the movement of the first movable plate 2 and the second movable plate 3, the crystals attached to the side walls of the first flow guide plate 5 and the second flow guide plate 6 are scraped off by the first movable plate and the second movable plate 3, and are discharged with the exhaust gas. The width of the first flow guide plate 5 is designed according to the spray range of the urea nozzle 7, which can completely cover the crystalizable area within the spray range of the urea nozzle 7, eliminate the increase of crystals, and adapt to a change in a flow rate of exhaust gas under different engine operating conditions so as to automatically remove internal crystals, thereby preventing the crystals from blocking the urea mixer, avoiding excessive engine exhaust back pressure, ensuring the performance of the engine, and improving the service life of the engine and the adaptive urea mixer.

In another specific embodiment of the present invention, in order to improve the structural stability and strength of the adaptive urea mixer, the adaptive urea mixer further comprises a second fixed ring 17 which is circumferentially fixedly connected to the inner side wall of the housing 1, the second fixed ring 17 is located between the first movable plate 2 and the air inlet 8, and the first flow guide plate 5, the second flow guide plate 6 and each of the guide columns 9 all extend to a second fixed plate and are fixedly connected to the second fixed plate.

In another specific embodiment of the present invention, the air inlet 8 of the adaptive urea mixer is used to connect with an exhaust pipe, and the rigidity of the first elastic support element 12 is greater than the rigidity of the second elastic support element 13. When the exhaust gas pressure gradually increases, since the rigidity of the first elastic support element 12 is greater than the rigidity of the second elastic support element 13, the second movable plate 3 will move before the first movable plate 2, and the moving distance of the second movable plate 3 is greater than the moving distance of the first movable plate 2, so that the volume of the mixing space 14 becomes larger. The mixing efficiency is changed to adapt to a change in a flow rate of exhaust gas under different engine operating conditions, which not only ensures the mixing effect of the urea aqueous solution and the exhaust gas so that the urea aqueous solution and the exhaust gas are fully mixed, but also effectively avoids excessive engine exhaust back pressure so as to ensure the performance of the engine. The rigidity of the first elastic support element 12 is set to be below the maximum exhaust gas pressure, so that the position of the first movable plate 2 after the movement does not exceed the position of the urea nozzle 7, and it is better to keep the position of the first movable plate 2 outside the spray range of the urea nozzle 7.

In another specific embodiment of the present invention, in order to facilitate the movement of the first movable plate 2 and the second movable plate 3 and reduce the movement resistance, the second flow guide plate 6 of the adaptive urea mixer comprises a first arc-shaped plate with an axis parallel to the axis of the housing 1. The first flow guide plate 5 comprises a flow guide flat plate and a second arc-shaped plate formed from one side of the flow guide plate, and the axis of the second arc-shaped plate is parallel to the axis of the housing 1.

In another specific embodiment of the present invention, the first elastic support element 12 and the second elastic support element 13 of the adaptive urea mixer are both springs.

In another specific embodiment of the present invention, the first movable plate 2 and the second movable plate 3 a the adaptive urea mixer are provided with a first guide groove and a second guide groove for penetrating the first flow guide plate 5, respectively, both the first guide groove and the second guide groove are in clearance fit with the first flow guide plate 5; the first movable plate 2 and the second movable plate 3 are provided with a third guide groove and a fourth guide groove for penetrating the second flow guide plate 6, respectively, and both the third guide groove and the fourth guide groove are in clearance fit with the second flow guide plate 6.

In another specific embodiment of the present invention, there are three guide columns 9 of the adaptive urea mixer, which are circumferentially evenly distributed on the first fixed ring 4.

In another specific embodiment of the present invention, when the exhaust volume is reduced, in order to make the first movable plate 2 and the second movable plate 3 easy to return to their original positions and prevent the adaptive urea mixer from generating noise during use due to the fact that the elastic element shakes on the guide columns 9, the initial states of the first elastic support element 12 and the second elastic support element 13 of the adaptive urea mixer are both compressed states, so that both ends of the first elastic support element are pressed against the first movable plate and the second position-limiting portion, respectively, and both ends of the second elastic support element are pressed against the second movable plate and the first fixed ring, respectively.

In another specific embodiment of the present invention, in order to further reduce the back pressure, a plurality of vent holes are distributed on both the first movable plate 2 and the second movable plate 3 of the adaptive urea mixer.

It should be noted that the adaptive urea mixer provided by the present invention is not limited to only two movable plates that can slide along the guide column, that is, the first movable plate and the second movable plate. Arbitrary number of movable plates slidingly sleeved on the guide column are provided between the second movable plate and the first fixed ring, and vent holes are provided on each movable plate. An elastic support element is provided between adjacent movable plates and between the first fixed ring and the adjacent movable plates, respectively. The adaptive urea mixer provided by the present invention only needs to comprise at least a first movable plate and a second movable plate, so that the first movable plate, the second movable plate, the first flow guide plate and the second flow guide plate define a mixing space, so as to facilitate the mixing of the urea aqueous solution and the exhaust gas and to improve the mixing efficiency. The shape of the first movable plate and the second movable plate is not limited, and it only requires that the first movable plate and the second movable plate can slide in the housing and the exhaust gas discharged from the exhaust pipe can enter the mixing space to be mixed with the urea aqueous solution. In the adaptive urea mixer provided by the present invention, the first elastic support element and the second elastic support element are not limited to springs, and other elastic elements that can play a role of elastic support may also be used. The adaptive urea mixer provided by the present invention does not limit the shape and the structure arrangement of the first position-limiting portion and the second position-limiting portion, and the first position-limiting portion and the second position-limiting portion are detachably connected or fixedly connected to the guide column, as long as the movement and displacement of the first movable plate and the second movable plate can be restricted, respectively. The adaptive urea mixer provided by the present invention does not limit the cross-sectional shape of the inner cavity of the housing, which can be circular, square or in other polygonal shapes.

In the present invention, specific examples are used to illustrate the principles and implementation of the present invention. The description of the above examples is only used to help, understand the method and core idea of the present invention; at the same time, for those skilled in the art, the specific implementation and application scope will be changed according to the idea of the present invention. In summary, the content of this specification should not be construed as limiting the present invention.

What is claimed is:

1. An adaptive urea mixer, comprising a housing, a first movable plate, a second movable plate, a first fixed ring, a first flow guide plate, a second flow guide plate, and a urea nozzle;

wherein the housing is a hollow cylinder, the housing is formed with an air inlet and an air outlet at two opposite ends, respectively, the first movable plate, the second movable plate, and the first fixed ring are sequentially provided in a direction from an air inlet to an air outlet in the housing;

the first fixed ring is circumferentially fixedly connected to an inner side wall of the housing, a plurality of guide columns provided in parallel are circumferentially fixedly provided on the first fixed ring, each of the guide columns extends toward the air inlet, a first position-limiting portion and a second position-limiting portion are provided on each of the guide columns, and the second position-limiting portion is located between the first fixed ring and the first position-limiting portion;

the first movable plate is slidingly sleeved on the guide column between the first position-limiting portion and the second position-limiting portion, the second movable plate is slidingly sleeved on the guide column between the second position-limiting portion and the first fixed ring, a first elastic support element is sleeved on the guide column between the second position-limiting portion and the first movable plate, and a second elastic support element is sleeved on the guide column between the first fixed ring and the second movable plate;

one end of the first flow guide plate and one end of the second flow, guide plate are both fixedly connected to the first fixed ring, both the first flow guide plate and the second flow guide plate extend toward the air inlet and pass through the second movable plate and the first movable plate in turn, the first movable plate and the second movable plate are provided with a first notch and a second notch, respectively, the first notch and the second notch are located on both sides of the first flow guide plate, respectively, the first movable plate, the second movable plate, the first flow guide plate, and the second flow guide plate define a mixing space;

the urea nozzle is provided on a side wall of the housing corresponding to the mixing space.

2. The adaptive urea mixer according to claim 1, further comprising a second fixed ring which is circumferentially fixedly connected to the inner side wall of the housing, the second fixed ring is located between the first movable plate and the air inlet, and the first flow guide plate, the second flow guide plate and each of the guide columns all extend to a second fixed plate and are fixedly connected to the second fixed plate.

3. The adaptive urea mixer according to claim 1, wherein the air inlet is used to connect with an exhaust pipe, and the rigidity of the first elastic support element is greater than the rigidity of the second elastic support element.

4. The adaptive urea mixer according to claim 1, wherein the second flow guide plate comprises a first arc-shaped plate with an axis parallel to an axis of the housing.

5. The adaptive urea mixer according to claim 1, wherein the first flow guide plate comprises a flow guide flat plate and a second arc-shaped plate formed from one side of the flow guide plate, and an axis of the second arc-shaped plate is parallel to an axis of the housing.

6. The adaptive urea mixer according to claim 1, wherein the first elastic support element and the second elastic support element are both springs.

7. The adaptive urea mixer according to claim 1, wherein the first movable plate and the second movable plate are provided with a first guide groove and a second guide groove for penetrating the first flow guide plate, respectively, both the first guide groove and the second guide groove are in clearance fit with the first flow guide plate; the first movable plate and the second movable plate are provided with a third guide groove and a fourth guide groove for penetrating the second flow guide plate, respectively, and both the third guide groove and the fourth guide groove are in clearance fit with the second flow guide plate.

8. The adaptive urea mixer according to claim 1, wherein there are three guide columns, which are circumferentially evenly distributed on the first fixed ring.

9. The adaptive urea mixer according to claim 1, wherein both the initial states of the first elastic support element and the second elastic support element are compressed states.

10. The adaptive urea mixer according to claim 1, wherein a plurality of vent holes are distributed on both the first movable plate and the second movable plate.

* * * * *